Jan. 9, 1945.  L. W. CHUBB, JR  2,367,096
ANTI-GLARE DEVICE
Filed Feb. 19, 1942

Lewis H. Chubb, Jr.
INVENTOR.
BY
Donald L. Brown

Patented Jan. 9, 1945

2,367,096

UNITED STATES PATENT OFFICE 2,367,096

ANTIGLARE DEVICE

Lewis W. Chubb, Jr., Sharon, Mass., assignor to Polaroid Corporation, Dover, Del., a corporation of Delaware Application February 19, 1942, Serial No. 431,522

6 Claims. (Cl. 88—65)

This invention relates to a device for use in optical systems employing polarized light, and more particularly to a device for use in automobile headlighting systems employing polarized light.

It is an object of the present invention to provide means for protecting the driver of a vehicle from glare resulting from the reflection in his rear view mirror of polarized light from the headlights of a following vehicle.

Another object of the invention is to provide such protective means without otherwise materially affecting the ability of the driver to utilize his rear view mirror for seeing through the rear window of his vehicle.

A further object is to provide such protective means in the form of fractional wave retardation material incorporated with the rear window or rear view mirror of the vehicle and so positioned with respect to its vibration directions and the vibration direction of the polarized light incident on said window from a following vehicle equipped with polarizing headlights as to alter the polarization characteristics of said light so that it will be blocked by the analyzing means of the driver of said vehicle when reflected thereagainst by his rear view mirror.

Still further objects are to provide such protective means in the form of half-wave retardation material, to provide said half-wave material in addition to the rear window of the vehicle, to provide said half-wave material as a part of said window, and alternatively to provide such protective means in the form of quarter-wave retardation material incorporated with the rear view mirror of the vehicle.

Additional objects and advantages will in part appear and in part be pointed out in the course of the following detailed description of one or more embodiments of the invention, which are given as non-limiting examples, in connection with the accompanying drawing, in which.

Figure 1:
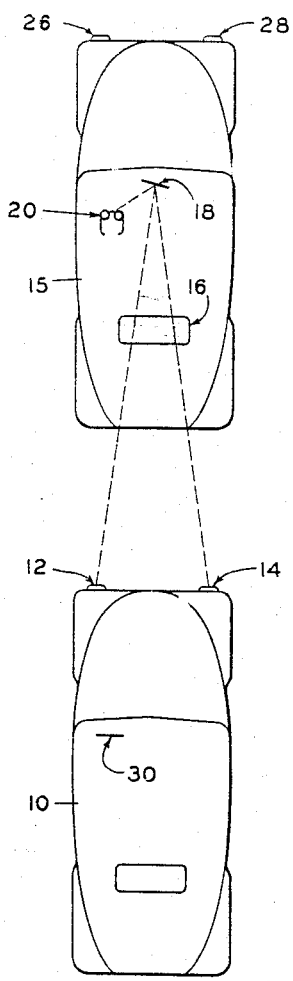
Figure 1 is a plan view of two automobiles in relative positions which give rise to the problem which it is the object of the present invention to overcome.

In driving automobiles at night, a frequent source of undesirable glare is light originating from the headlights of the second of two cars, which passes through the rear window of the first of the cars and is reflected into the eyes of the driver of the first car by his rear view mirror. This problem is illustrated in Fig. 1, wherein the light from headlights 12 and 14 of car 10 is shown by dotted lines as passing through rear window 16 of car 15 and being reflected by mirror 18 towards spectacles 20, indicated as being worn by the driver of car 15. The present invention is directed towards the provision of means for preventing this glare-producing light from reaching the eyes of the driver of the first of the two cars.

The system of the invention is designed for incorporation in automobiles employing polarizing headlights and analyzing means therefor worn by the driver or suitably positioned before his eyes within the car. It is immaterial to the effectiveness of the invention whether the headlighting system wherein it is employed utilizes linearly polarized or circularly polarized light, provided all automobiles utilize the same system. Since, however, the latter requirement is essential to the success of any headlighting system employing polarized light, it is in no way a limitation on the scope of the invention.

Figure 2:
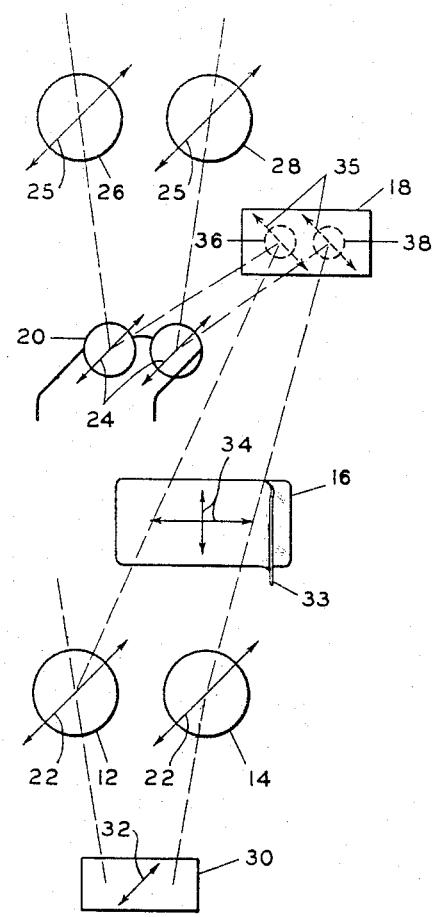
Figure 2 is a diagrammatic view of an optical system embodying a form of the invention and solving the problem indicated in Fig. 1.

In Fig. 2, all of the elements shown are represented as they appear to the driver of car 10. That is to say, the uppermost surface of each element shown in Fig. 2 is the surface facing the driver of car 10. Elements 12 and 14 represent the headlight lenses of car 10, and said lenses are indicated as being adapted to transmit polarized light vibrating parallel to arrows 22. Spectacles 20 worn by the driver of car 15 are provided with polarizing lenses adapted to transmit linearly polarized light vibrating parallel to arrows 24. Car 15 is similarly provided with polarizing headlights adapted to transmit polarized light vibrating parallel to arrows 25 and comprising a left headlight 26 and a right headlight 28. Similarly the driver of car 10 is illustrated as being provided with analyzing viewing means comprising a polarizing visor 30 adapted to transmit light vibrating parallel to arrow 32. When, therefore, cars 10 and 15 are in the relative positions shown in Fig. 1, it will follow that arrows 22, 24, 25 and 32 will all be relatively parallel. The polarized light transmitted by elements 12, 14, 20, 26, 28 and 30 vibrates at an angle of 45° to the vertical and horizontal. It will be seen that according to this system, if cars 10 and 15 approach each other face to face, then spectacles 20 will block polarized light emitted by headlights 12 and 14, and visor 30 will block light emitted by headlights 26 and 28. This arrangement of the headlights and analyzers is in accordance with the systems disclosed in U. S. Patents Nos. 2,031,045 to E. H. Land and 2,087,795 to L. W. Chubb.

It will now be seen that with cars 10 and 15 in the relation shown in Fig. 1, light from headlights 12 and 14, which passes through rear window 16 or car 15 and is reflected by rear view mirror 18 towards the eyes of the driver of car 15, will be transmitted by spectacles 20, since the polarization characteristics of linearly polarized light are not appreciably altered by such reflection, and it will accordingly reach the eyes of the driver of car 15 and produce the sensation of glare. The present invention proposes to prevent this glare by providing means for altering the polarization characteristics of the light transmitted by headlights 12 and 14 to such an extent that it will be blocked by spectacles 20 when reflected thereagainst by mirror 18. It proposes to accomplish this result by providing car 15 with birefringent material positioned in line with rear window 16 and mirror 18 and of such birefringence that it will function as half-wave retardation material for polarized light incident thereon from headlights 12 and 14 and so positioned as to rotate the vibration direction of such light through an angle of 90°.

According to one embodiment of the invention, the half-wave retardation material may comprise a sheet of half-wave retardation material 33, such for example as half-wave Cellophane, positioned in window 16 with its vibration directions in the positions indicated by arrows 34, that is to say, at angles of 45° to the vibration direction of the light emitted by headlights 12 and 14, and correspondingly at angles of 45° to the transmission axes of headlights 26 and 28. The half-wave material may, for example, be laminated to the inside or outside of the glass or plastic normally provided in window 16, as indicated in Fig. 2.

The operation of the invention will now be apparent from the drawing. The light emitted by headlights 12 and 14 is initially vibrating parallel to arrows 22. However, in passing through half-wave material 33 its vibration direction is rotated through 90°, so that it reaches mirror 18 vibrating parallel to dotted arrows 35, that is to say, at right angles to arrows 24 which indicate the transmission axes of spectacles 20. When, therefore, the light reflected by mirror 18 reaches spectacles 20, it will be blocked thereby and will thus be prevented from reaching the eyes of the driver. This result is indicated by dotted images 36 and 38 in mirror 18 of headlights 12 and 14 respectively.

The invention is subject to numerous modifications, particularly with respect to the materials employed and the manner in which they are incorporated in car window 16. For example, if sheet wave-retardation material such as Cellophane or mica is employed, it may be cemented to either surface of window 16, or it may be laminated between glass or plastic plates and the lamination used as a window. Alternatively, it may be mounted within the car in line with window 16 and mirror 18. If window 16 be made initially of safety glass or tempered glass, it may be converted for use in accordance with the present invention by means of complementary or supplementary birefringent material, in accordance with Patent No. 2,237,565 to E. H. Land. That is to say, there may be added to the window additional birefringent material of such birefringence that the net retardation produced by the composite window will be a half wave.

It is not essential that the half-wave material in window 16 function either as a half-wave plate for all wavelengths or as a single half-wave plate. The principles of the invention will be fulfilled if said material functions to retard one component of the light from headlights 12 and 14 by any uneven number of half-wave lengths. If the birefringent material be a half-wave plate for less than the entire visible spectrum, it is preferred that it be as nearly as possible a full half-wave retardation plate for light in the yellow-orange band of the spectrum, for if this condition obtains, the image of lights 12 and 14 in mirror 18 will be of a blue-green color, which is much less irritating to the eye than light adjacent the other end of the visible spectrum. If desired, such a half-wave plate for a predetermined wavelength band may be combined with a mirror adapted to absorb light of the complementary wavelength band, which will thus substantially completely extinguish the images of the headlights. For example, if window 16 functions as a half-wave plate for light in the yellow-orange band of the spectrum, mirror 18 may be adapted to absorb blue-green light. Other similar modifications of this form of the invention will be apparent to those skilled in the art and are to be understood as coming within the scope thereof.

Figure 3:
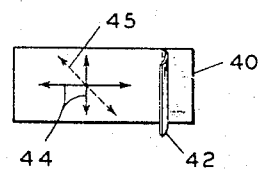
Figure 3 is an elevation of the face of a rear view mirror embodying a modification of the invention.

Fig. 3 shows a modified form of the invention which may be substituted in Figs. 1 and 2 in place of rear view mirror 18 and birefringent sheet 33. It comprises a rear view mirror 40, to which is secured as by suitable adhesive means a sheet 42 of quarter-wave retardation material positioned with its vibration directions in the positions indicated by arrows 44. That is to say, arrows 44 should make angles of substantially 45° with arrows 24 and 25 in Fig. 2. Sheet 42 may comprise, for example, a sheet of quarter-wave Cellophane or mica, and if this rear view mirror assembly is substituted for mirror 18 in Figs. 1 and 2, then it is not necessary to have half-wave retardation material in rear window 16. The operation of this modification of the invention is substantially the same as that explained above in connection with Figs. 1 and 2. When polarized light vibrating parallel to arrows 22 is incident on quarter-wave plate 42, it will be transmitted through to mirror 40 and then be reflected back again through quarter-wave plate 42, and the result will be substantially the same as if the light had initially passed through a half-wave plate, that is to say, its vibration direction will be rotated through 90°. When, therefore, it is then incident upon analyzing means such as spectacles 20, it will be vibrating at right angles to their transmission axes and will accordingly be blocked and prevented from reaching the eyes of the driver.

The device shown in Fig. 3 is also applicable to automobile headlighting systems employing circularly polarized light. In this event, if it be assumed that the quarter-wave plates user are achromatic, then it is immaterial to the operation of the system how sheet 42 is positioned with respect to its vibration directions. For preferred achromatic results, however, sheet 42 will preferably be positioned with its principal vibration direction substantially perpendicular or at right angles to the principal vibration directions of the quarter-wave plates used in the headlights and analyzer of the vehicle wherein mirror 40 is used. That is to say, if in Fig. 2 arrows 22 and 25 represent the principal vibration directions of the quarter-wave material used to convert headlights 12 and 14 and 26 and 28, respectively, to circularly polarizing headlights, arrows 24 will represent the principal vibration direction of the quarter-wave material combined with the polarizers in spectacles 20, and sheet 42 should then be positioned with its principal vibration direction in the position indicated by arrow 45, that is to say, substantially at right angles to arrows 22, 24 and 25.

It should be apparent that the invention is in no way limited to the use of analyzing spectacles as described, but will operate equally well with any polarizing analyzing viewing screen, such for example as a drop-flap visor of the type represented at 30, positioned substantially between the eyes of the driver of car 15 and mirror 18. Many other, similar modifications of the invention will doubtless be apparent to those skilled in the art, and are to be construed as coming within the scope thereof. Furthermore, it will be understood that car 10 will be provided with a mirror and rear window arrangement similar to that in car 15.

It should be noted that one advantage of the present invention is that it does not in any way interfere with the ability of the driver to see through his rear window by means of his rear view mirror, except as to polarized light reaching the mirror through the rear window. With that single exception, the driver may see clearly through his rear window, either by means of his rear view mirror or by turning his head and looking directly therethrough. It should also be noted that the described embodiments of the invention will function equally well if the polarized lighting system adopted in automobiles embodies polarizers having their transmission axes at right angles to arrows 22 and 26, or if circularly polarized light is employed. In the latter case, the half-wave material in window 16 or quarter-wave material on the rear view mirror will serve to convert clockwise circularly polarized light to counterclockwise circularly polarized light, or vice versa, and the result, when incorporated in the circularly polarized lighting proposed for automobiles, will be the same as that described above in connection with linearly polarized light. That is to say, the half-wave material in window 16 will so alter the characteristics of circularly polarized light emitted by headlights 12 and 14 that it will be blocked by spectacles 20 when reflected thereagainst by mirror 18.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a vehicle provided with polarizing headlights, analyzing means adapted to transmit the light from said headlights when reflected thereagainst from a non-depolarizing surface without alteration of its polarization characteristics, and a rear view mirror within said vehicle, means for preventing polarized light from the headlights of a following vehicle having substantially the same polarizing properties as said first named headlights from being transmitted from said mirror to the eyes of the driver of said first named vehicle, said last named means comprising a rear window comprising fractional wave retardation material of such birefringence that it will alter the polarization characteristics of polarized light incident thereon from behind said vehicle to a state of polarization such that it will be blocked by said analyzing means when reflected thereagainst by said mirror.

2. In a vehicle provided with polarizing headlights, analyzing means adapted to transmit the light from said headlights when reflected thereagainst from a non-depolarizing surface without alteration of its polarization characteristics, and a rear view mirror within said vehicle, means for preventing polarized light from the headlights of a following vehicle having substantially the same polarizing properties as said first named headlights from being transmitted from said mirror to the eyes of the driver of said first named vehicle, said last named means comprising a rear window comprising half-wave retardation material.

3. In a vehicle, polarizing headlights adapted to transmit plane polarized light, analyzing means positioned within said vehicle with its transmission axis substantially parallel to the transmission axes of said headlights, a rear view mirror within said vehicle, and means for preventing polarized light from the headlights of a following vehicle having substantially the same polarizing properties as said first named headlights from being transmitted from said mirror to the eyes of the driver of said first named vehicle, said last named means comprising a rear window comprising half-wave retardation material positioned with its vibration directions at angles of substantially 45° to the transmission axes of the headlights of said first named vehicle.

4. In a vehicle, polarizing headlights adapted to transmit plane polarized light, analyzing means positioned within said vehicle with its transmission axis substantially parallel to the transmission axes of said headlights, a rear window, a rear view mirror substantially in line with said rear window, and means for preventing polarized light from the headlights of a following vehicle having substantially the same polarizing properties as said first named headlights from being transmitted from said mirror to the eyes of the driver of said first named vehicle, said last named means comprising fractional wave retardation material incorporated with said rear window with its vibration directions at angles of substantially 45° to the transmission axes of the headlights of said first named vehicle, said fractional wave retardation material being substantially half-wave retardation material for light in the yellow-orange band of the spectrum.

5. In a vehicle, polarizing headlights adapted to transmit plane polarized light, analyzing means positioned within said vehicle with its transmission axis substantially parallel to the transmission axes of said headlights, a rear view mirror within said vehicle, and means for preventing polarized light from the headlights of a following vehicle having substantially the same polarizing properties as said first named headlights from being transmitted from said mirror to the eyes of the driver of said first named vehicle, said last named means comprising a rear window comprising fractional wave retardation material positioned with its vibration directions at angles of substantially 45° to the transmission axes of the headlights of said first named vehicle, said fractional wave retardation material being substantially half-wave retardation material for light in the yellow-orange band of the spectrum, said rear view mirror being adapted to absorb light in the blue-green band of the spectrum.

6. In a vehicle, polarizing headlights adapted to transmit circularly polarized light circularly polarized in a predetermined sense, circularly polarizing analyzing means positioned within said vehicle and adapted to transmit circularly polarized light circularly polarized in the opposite sense from the light emitted by said headlights, a rear view mirror within said vehicle, and means for preventing polarized light from the headlights of a following vehicle having substatially the same polarizing properties as said first named headlights from being transmitted from said mirror to the eyes of the driver of said first named vehicle, said last named means comprising a rear window comprising half-wave retardation material.

LEWIS W. CHUBB, Jr.